Sept. 9, 1952  L. A. DOUGHTY  2,609,945
BATTERY PLATE FEED DEVICE
Filed May 20, 1948  3 Sheets-Sheet 1
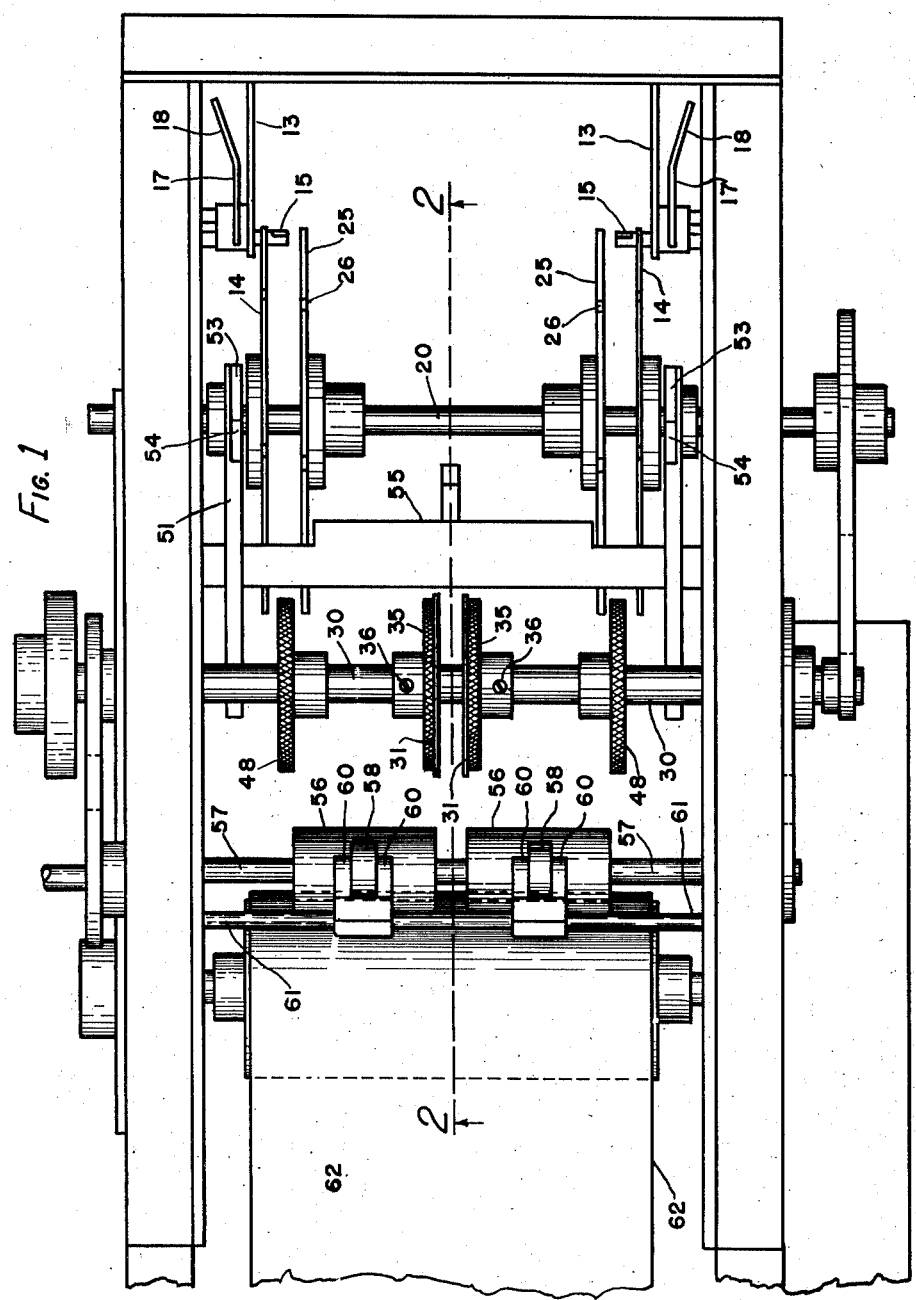
INVENTOR
LEON A. DOUGHTY
BY
Barr, Borden & Fry
ATTORNEY

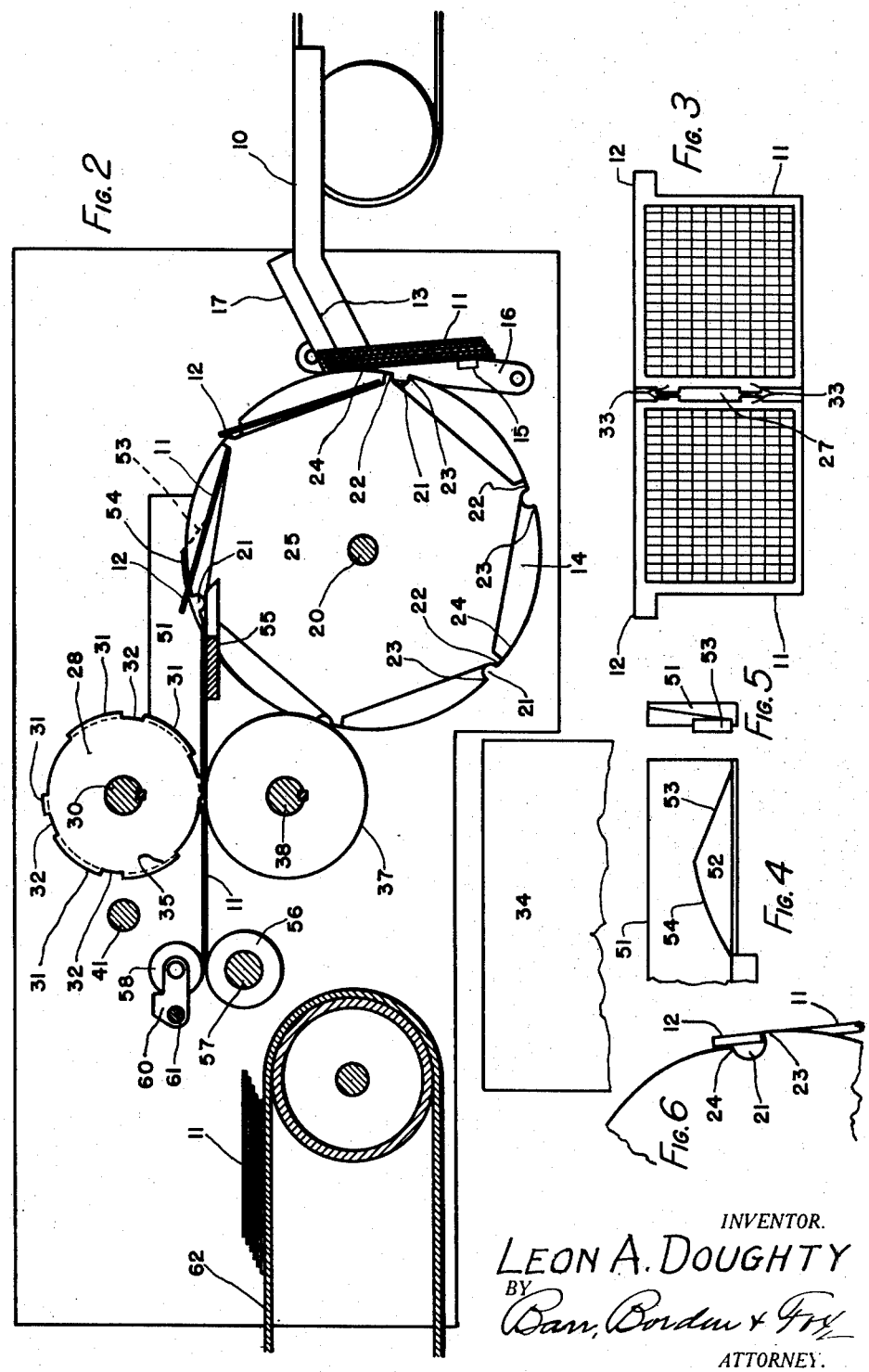

Sept. 9, 1952　　　　　　　L. A. DOUGHTY　　　　　2,609,945
BATTERY PLATE FEED DEVICE
Filed May 20, 1948　　　　　　　　　　　　　　3 Sheets-Sheet 3
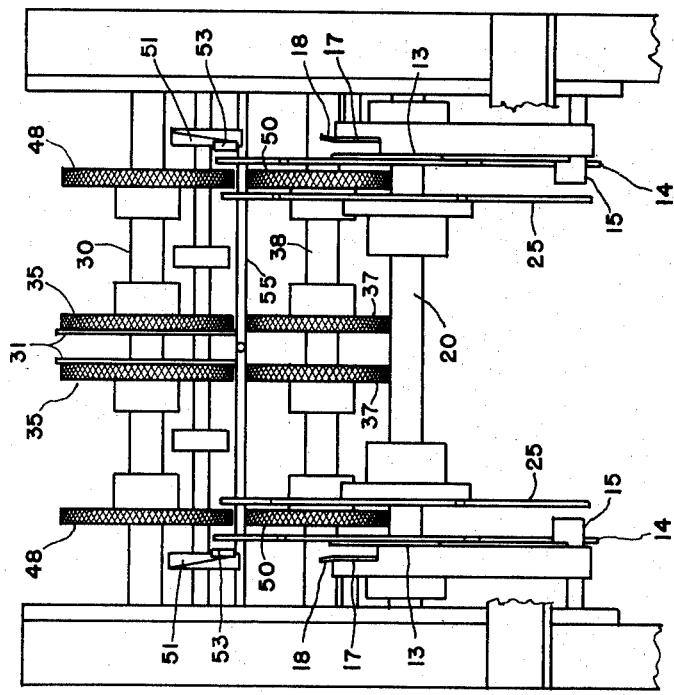
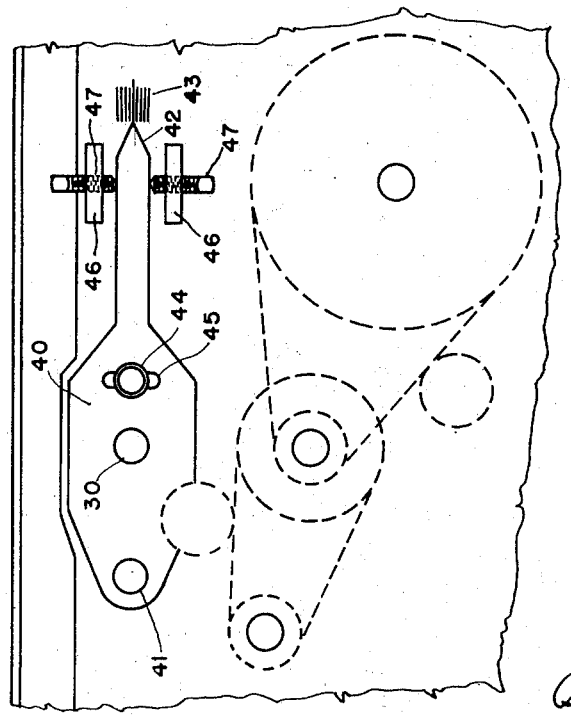
INVENTOR.
LEON A. DOUGHTY
BY
Barr, Borden & Fox Patented Sept. 9, 1952

2,609,945

UNITED STATES PATENT OFFICE 2,609,945

BATTERY PLATE FEED DEVICE

Leon A. Doughty, Glenside, Pa., assignor to C & D Batteries, Inc., Conshohocken, Pa., a corporation of Pennsylvania Application May 20, 1948, Serial No. 28,148

5 Claims. (Cl. 214—8.5)

The present invention relates to storage batteries and more particularly to a step in the manufacture of the plates for such batteries.

For economical reasons storage battery plates are cast in panels of two plates side by side in the same plane and are medially connected in the casting operation by a center bar or strip. The panels of the cast grids are pasted with active material ready for charging. The cost and loss of time in cutting out the center bar presents a serious problem in the manufacture of battery plates.

Some of the objects of the present invention are: to provide means for automatically removing the center connecting bar between two pasted battery plates, so that each separated plate is ready for assembling in a battery jar; to provide a machine for separating the two plates of a cast panel regardless of different heights and thicknesses; to provide a machine for separating raw plates, skin dried from pasting machine, dried plates, formed plates and dry charged plates without fracturing the grid or loosening the active material; to provide a machine for separating plates wherein provision is made for feeding the plates in quick succession through a shearing mechanism; to provide a novel plate shearing mechanism wherein the connecting bar between two plates of a panel is removed while leaving the pairs of feet on the bottom edge of each plate; to provide a plate shearing mechanism wherein provision is made for adjustment to operate on plates of different thicknesses and varying heights; to provide a plate shearing mechanism wherein provision is made for adjustment for center connecting bars of different dimensions; and to provide other improvements as will hereinafter appear.

In the accompanying drawings, Fig. 1 represents a plan of a plate separating machine embodying the present invention; Fig. 2 represents a section on line 2—2 of Fig. 1; Fig. 3 represents a side elevation of a two plate pasted panel which is to be separated; Fig. 4 represents a detail in side elevation of one of the like lifting cams; Fig. 5 represents an end elevation of the part shown in Fig. 4; Fig. 6 represents an enlarged detail of the pick-up finger engaging the lug of a plate panel; Fig. 7 represents a front elevation of the machine, the legs and frame supports being broken away; and Fig. 8 represents a detail side elevation from the left side of the machine showing the shearing disc adjusting arm, which is a counterpart of the arm on the right side of the machine.

Referring to the drawings, one form of plate separating machine embodying the invention is shown comprising generally a plate-receiving portion, a pick-up unit for successively feeding the plates, a shearing mechanism, a discharge unit, and a delivery conveyor for removing the separated plates, all of said mechanism being preferably mounted upon a suitable frame supported by the floor. In the following description the term "plate" is used broadly and means generally two battery plates interconnected by a center connecting bar.

The plate-receiving portion comprises two rails 10, so spaced apart that the body of two interconnected battery plates 11 can be suspended between them by the usual plate end lugs 12 which seat on the top of the rails 10. These rails 10 are horizontally disposed and preferably terminate at their outer ends in such close proximity to the delivery end of a pasting machine as to allow the pasted plates to be received and fed forward to the entrance of the separating machine proper. While this automatic feeding of the plates is preferred, the plates can be manually pushed towards the entrance of the separating machine if such feeding is necessary for any reason.

For delivering each pair of connected plates 11 from the rails 10 to the pick-up unit, the ends of the rails 10 at the entrance to the machine are downwardly inclined to form a two rail ramp 13, each rail of which supports a plate end lug 12 so that all of the plates hang substantially vertical but ride by gravity to bring the lugs 12 of the first plate pair into contact relation with faces of the two pick-up discs 14 as a stop for all of the plate pairs, while the lower suspended portion of the first plate pair abuts two stops 15 to thus prevent the plates from swinging out of the proper pick-up position. The two stops 15 project inwardly respectively from opposite inner sides of the machine frame being caried by links 16 which also serve as supports for the ramp 13. An important adjunct of the ramp unit is two strip guides 17 carried by the links 16 and respectively paralleling the ramp rails 13 but projecting above the plane of the top of the rails, and spaced therefrom a distance to permit the plate lugs 12 to contact and slide along the inner faces of such guide bars. Each such guide 17 has an outwardly flared end 18 arranged in the path of the moving plate lugs to provide a funnel action which guides the lugs 12 onto the ramp rails 13 to properly aline all of the plates 11 laterally. These guides 17 are supported by the aforesaid links 16.

The pick-up unit comprises the discs 14 which are fixed to a driven shaft 20 in such spaced relation as will allow the length of the body of the plate 11 to enter between them while the lugs 12 overlie the respective edges of the said discs 14. As shown, the pick-up means comprises a plurality of subtantially semi-circular recesses 21 in the respective circumferential edges of the two discs 14, the arrangement being such that the recesses in one disc are respectively in exact horizontal alinement with the recesses in the other disc 14. As shown, each disc 14 has a diameter such as to provide six recesses 21 equally spaced circumferentially a distance greater than the width of a plate 11. To provide the required pick-up action, the radii of each disc 14 are gradually shortened from a point near each recess 21 so that the leading edge 22 of each recess is circumferentially nearer the axis of the disc than the trailing edge 23, which latter thus has a circumferential path of travel approximately one sixteenth of an inch greater than the leading edge, to function as a finger to travel under the lugs to lift each plate panel. Thus, as the discs rotate counter-clockwise as viewed in Fig. 2, each pair of edges 23 will ride under the two lugs of one plate and cause it to be stripped upwardly away from the other plates. This action is made possible because the lugs 12, in riding contact with the inwardly turned arcuate face 24, bring the plate lugs into pick-up position above the edges 23. In this connection, it should be noted that the discharge end of the ramp 13 is preferably located just above the horizontal plane passing through the axis of rotation of the discs 14, so that pick-up edges 23 are effective as supports for the lugs 12 while the discs turn through an angle of approximately ninety degrees.

In order to support the body of a plate 11 as it is conveyed upwardly and also to eject the plate for delivery to the shearing mechanism, two shover discs 25 are fixed to the shaft 20 between the pair of discs 14, and so located as to be juxtaposed to the body of the plate, namely the plate portion between the lugs 12. Each shover disc 25 is of polygonal contour, and in the present instance each is in the form of a hexagon, the sides of which have a length sufficient to allow the body of a plate to rest against it as the plate is carried upward by the pick-up discs 14. Each hexagon side terminates at one end in an outwardly radially disposed projection 26, which becomes effective as a pusher against the bottom of a plate when the rotation of the discs 14 brings a plate to the point where the lugs 12 are to be removed from the recess edges 23. The shover discs 25 are mounted so that each projection 26 on one disc is laterally alined with the corresponding projection 26 on the other disc. Each pair of shover discs 25 carry the bottom of plate 11 from vertical position to horizontal position in first ninety degrees travelled. It should be noted that both pairs of discs 14 and 25 are preferably fastened by set screws to the shaft 20.

In order to separate the two interconnected plates by removing the center connecting bar 27 between the grids which are filled with active material, a pair of shearing discs 28 are adjustably keyed to a driven shaft 30 in such position that the plates 11 discharges from the pick-up unit travel tangentially across the bottom of the discs 28. The two shearing discs 28 are provided with radially projecting arcuate knives 31 about the periphery, the discs 28 being precisely spaced apart a distance to simultaneously sever the respective webs of the connecting bar 27 from the attached plate body. Circumferentially the knives 31 are spaced apart and so dimensioned as to length as to conform to the lengths of the sides of the bar 27 to be cut away. Thus, at proper intervals knife-free recesses 32 are provided to pass over the grid parts 33 which remain to become the feet of the plate when assembled in a battery. Since the space between opposed feet parts 33 contains active material, it readily breaks away under the weight of the severed connecting bar 27 as the latter drops into a container 34 located below the severing point. As shown, each shearing disc 28 is attached to the side face of a knurled faced feed wheel 35 keyed to the shaft 30 and axially adjustable by means of a set screw 36 to conform to plates having connecting bars of different width. Below and vertically alined with each feed wheel 35 is a knurl-faced feed wheel 37 axially adjustable and keyed to a driven shaft 38. The distance between each pair of feed wheels 35 and 37 is adjusted to substantially match the thickness of the plates being used, the desiratum being that two knurled wheel surfaces grip the plate between them with effective feeding action. In connection with this adjustment, it should be noted that the shaft 30, of the shearing disc 28 and feed wheels 35, projects through the slotted sides respectively of the machine frame for journalling in side arms 40, which are arranged for arcuate swinging action about pivot pins 41 carried by the machine frame. The free ends of these arms 40 terminate respectively in pointers 42 riding adjacent scales 43 which are graduated in plate thickness. The arms 40 can be locked in a selected position respectively by stud bolts 44 which traverse slots 45 in the respective arms. For close vernier adjustment each pointer 42 lies between a pair of fixed lugs 46 provided respectively with vertically disposed threaded adjusting pins 47 arranged in the plane of the respective pointers 42, for engaging the upper and lower edges of the pointers for exact setting of the shearing discs 28.

To ensure positive feeding of the plates to maintain proper transverse alinement of the leading edge of the plates, two knurled-faced feed wheels 48 are keyed to the shaft 30 for vertical alinement respectively with two knurled-faced feed wheels 50 keyed to the shaft 38. The wheels 48 being on the shaft 30, are thus vertically adjustable for plate thickness. Each pair of feed wheels 48 and 50 are in position to aline with the outer edge margin of the plate for proper feeding action.

In order to lift the plate lugs 12 out of the pick-up recesses 21 so that the plates are free to be pushed forward by the shover projections 26, two guide bars 51 are fixed in position at opposite sides of the machine and so spaced that the lugs of each plate can enter between them for proper guiding action. On the inner face of each such guide bar 51 is a cam 52 which projects into the path of the plate lug on that side, such cam 52 having an upwardly inclined face 53 leading to a downwardly inclined track 54 which is radially slightly greater than the radius of the pick-up disc 14. Thus, as each pair of lugs on each plate rides over the cam 52, the leading edges will be lifted out of the two pick-up recesses 21 by the faces 53 and are free to ride down the tracks 54 while the trailing edge of the plate is engaged by the shover projections so that the plate is pushed forward to ride horizontally across a guide bar 55 supported in fixed position between the side frames of the machine and at the proper level to guide the plates in true alinement with the path between the pairs of feed wheels. Hence, as each plate is released from the pick-up disc it is pushed forward by the shover disc across the guide bar 55 and into position to be gripped by the four pairs of knurled feed wheels. It should here be noted that the feed wheels 37 and 50 on the shaft 38 are driven at a faster speed than the pick-up discs 14 and shover discs 25 on the shaft 20. This ensures each delivered plate being carried forward promptly to clear the way for the next succeeding discharged plate.

In order to deliver the separated plates to a stacking point, the plates leave the shearing discs 28 and have their leading edges brought over the top of a pair of driven knurled surface rollers 56 keyed to a shaft 57, and under a pair of idler, vertically self-adjusting hold-down rollers 58. The rollers 58 are respectively journalled in pairs of arms 60 pivotally carried by a common fixed rod 61 supported transversely by the side frames of the machine. In the present instance, the stacking support is in the form of a conveyor belt 62 having its receiving end operatively positioned with respect to the discharging rollers 58 to allow the plates to be gently deposited thereon. The conveyor is power driven at such properly timed speed as will allow the pairs of separated plates to build up in stepped relation.

It will be understood that all shafts of the machine are power driven and therefore project through the side frames of the machine to mount gears, sprocket and sprocket chains for respectively actuating the respective shafts, so that each unit of the mechanism operates in precise timed relation to the other. Preferably the power supply is from a single electric motor mounted upon the machine frame.

The operation of the machine is as follows: With the arms 40 adjusted to locate the disc wheels 35 properly spaced from the feed wheels 37 for the particular thickness of plate panel to be separated, and the axial adjustment of such wheels duly made to straddle the particular connecting bar width of that panel, the machine is ready for use. A succession of plate panels is delivered to the ramps 13 and take the stacked position shown in Fig. 2, whereupon the pick-up discs 14 bring a finger of each simultaneously under the respective plate lugs 12 to lift the first panel upwardly to follow the turning movement of the discs 14. As the panel travels upwardly the body part thereof contacts and lies along one face of each shover disc 25 as a support. When the lifted plate nears the delivery point the lugs 12 thereof meet the cam faces 53 respectively, so that continuous turning of the pick-up discs causes the lugs 12 to be withdrawn by the lift fingers 23. When this occurs, the panel slides back momentarily to abut the shover projections 22, which latter then pushes the plate lug 12 over top of cams 52 into position to ride down the guide faces 54 for delivery to the guide bar 55, which, in turn, guides the leading edge of the panel between the pairs of discs 35, 37 and 48, 50. The knives 31 now successively sever all connected parts of the connecting bar 27 from the two plates, whereupon the released bar 27 drops by gravity into the container 34 leaving the grid feet undisturbed. Since the side margins of the connecting bar 27 ride respectively against the side faces of the feed wheels, this serves to keep the panel properly centered during the severing operation. The two disconnected plates now pass over the rollers 56 and under the holding-down rollers 58 to discharge upon the belt 62.

It will now be apparent that a complete unitary battery plate panel separating machine has been devised wherein a continuous succession of connected pairs of plates are fed to a severing point where each pair has the connecting bar between the plates removed and the separated plates delivered to a discharge support.

Having thus described my invention, I claim:

1. A feeding mechanism for a battery plate separating machine for removing the center bar which interconnects two battery plate grids to form a panel having end lugs comprising a pair of rails for supporting the lugs of a pair of interconnected battery plates to suspend the plates between said rails, a rotatable shaft, a pair of pick-up discs fixed to said shaft and respectively positioned to contact the bottom of said lugs, a pick-up finger on the periphery of each disc, said fingers being axially alined and operative to travel in a path to intercept the bottom of said lugs to remove said joined plates from said rails as said discs rotate, means at a predetermined point to remove said lugs from said fingers, and means connected to said rotatable shaft for supporting the plate when said lugs are removed and for ejecting said plate from said supporting position.

2. A feeding mechanism for a battery plate separating machine for removing the center bar which interconnects two battery plate grids to form a panel having end lugs, comprising means for delivering a panel of two plates from a receiving location to a discharge location, said delivery means including a pair of rotatable pick-up discs and a pair of rotatable discs for supporting the body of a panel while travelling with said pick-up discs from a vertical position to a substantially horizontal position, said pick-up discs having peripheral projecting fingers to engage and support the pair of lugs of said panel, said supporting discs having projections to push said panel, and means in the path of said lugs to lift said lugs off of said fingers to locate said panel in the path of said pusher projections, whereby said panel is ejected.

3. A feeding mechanism for a battery plate separating machine for removing the center bar which interconnects two battery plate grids to form a panel having end lugs, comprising means for delivering a panel of two plates from a receiving location to a discharge location, said delivering means including a rotatable pick-up unit for removing a panel one at a time from a stack of panels by engaging said panel lugs and a pair of rotatable discs for supporting the body of a panel while travelling with said pick-up discs from a vertical position to a substantially horizontal position, projections on the respective supporting discs positioned to engage the trailing edge of said panel, cam guides respectively in the path of said lugs to lift said lugs off said unit, means to drive said unit and discs in timed relation to pass said lugs over said cam to bring said panel into the path of said projections for feeding action, and means to guide said panel out of contact with said pick-up unit after engagement by said shover member.

4. In a battery plate separating machine, a ramp for bringing two plate panels to a pick-up point each panel having two grids connected by a center bar and also having projecting end lugs, stops adjacent the lower end of said ramp for causing received panels to stack in position suspended by said lugs, a rotatable pick-up unit having peripheral radially disposed fingers travelling in a path to pick up the lugs of one plate panel and carry the panel upwardly over the top of said pick-up unit into a substantially horizontal position, means adjacent said top for lifting said lugs off of said fingers, rotatable shover members for engaging the trailing edge of the panel as removed from said pick-up unit, and guiding means for delivering said panel from said lifting means.

5. In a battery plate separating machine, a plate feeding means comprising a rotatable pair of circular pick-up discs, each having circumferentially spaced recesses, the periphery of each disc gradually reducing in radius at one side of each recess to provide a projecting pick-up finger at the opposite side of each recess, a pair of polygonal shover discs rotatable in synchronism with said pick-up discs, the respective sides of said shover discs having a length to permit a plate to seat flat thereon, shover projections respectively formed at one end of each side, and cam means for removing a plate from said pick-up discs in advance of the engagement of said projections with such plate.

LEON A. DOUGHTY.

REFERENCES CITED

The following references are of record in the file of this patent:

UNITED STATES PATENTS

| Number | Name | Date |
|---|---|---|
| 1,372,824 | Norris | Mar. 29, 1921 |
| 1,650,425 | Burgess | Nov. 22, 1927 |
| 1,861,913 | Gannon | June 7, 1932 |
| 1,915,402 | Carleton et al. | June 27, 1933 |
| 1,953,170 | Goad | Apr. 3, 1934 |
| 2,047,472 | Hotchkiss | July 14, 1936 |
| 2,181,197 | Moritz | Nov. 28, 1939 |